(12) United States Patent
Huang

(10) Patent No.: US 12,324,511 B2
(45) Date of Patent: Jun. 10, 2025

(54) PARALLELLY-CONNECTABLE STORAGE RACK

(71) Applicant: Shenzhen Tongzhitai Technology Co., Ltd, Shenzhen (CN)

(72) Inventor: Huaqiao Huang, Shenzhen (CN)

(73) Assignee: Shenzhen Tongzhital Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/628,929

(22) Filed: Apr. 8, 2024

(65) Prior Publication Data
US 2025/0024940 A1    Jan. 23, 2025

(30) Foreign Application Priority Data

Jul. 18, 2023   (CN) .......................... 202321891025.6

(51) Int. Cl.
| | | |
|---|---|---|
| *A47B 57/40* | (2006.01) | |
| *A47B 47/00* | (2006.01) | |
| *A47B 57/10* | (2006.01) | |
| *A47B 57/34* | (2006.01) | |
| *A47B 96/20* | (2006.01) | |
| *A47B 57/06* | (2006.01) | |
| *A47B 57/26* | (2006.01) | |

(Continued)

(52) U.S. Cl.
CPC .......... *A47B 57/40* (2013.01); *A47B 47/0083* (2013.01); *A47B 57/10* (2013.01); *A47B 57/34* (2013.01); *A47B 96/201* (2013.01); *A47B 47/00* (2013.01); *A47B 57/06* (2013.01); *A47B 57/265* (2013.01); *A47B 57/545* (2013.01); *A47B 87/005* (2013.01)

(58) Field of Classification Search
CPC ... A47B 57/40; A47B 47/0083; A47B 96/201; A47B 87/005; A47B 87/008; A47B 87/007; A47B 47/0091; A47B 47/00; A47B 47/0008; A47B 47/021; A47B 47/045; A47B 57/06; A47B 57/08; A47B 57/10; A47B 57/26; A47B 57/265; A47B 57/30; A47B 57/32; A47B 57/34; A47B 57/54; A47B 57/545
See application file for complete search history.

(56) References Cited

U.S. PATENT DOCUMENTS

| | | | | |
|---|---|---|---|---|
| 3,523,508 | A  * | 8/1970 | Maslow | ............... A47B 57/265 |
| | | | | D6/675.2 |
| 4,799,818 | A  * | 1/1989 | Sudimak | .............. A47B 57/545 |
| | | | | 211/208 |

(Continued)

*Primary Examiner* — Devin K Barnett

(57) ABSTRACT

The present disclosure discloses a parallelly-connectable storage including: a plurality of bamboo-joint rods provided with a plurality of installation positions in their length direction; a clip piece arranged at the installation position of the bamboo-joint rod; a main tier-panel, of which four corners are respectively provided with a tapered casing engaging with the clip piece, and which is respectively provided with two hook holes on two end faces spliced with each other; and a first accessory tier-panel, of which two corners of one end is provided with tapered casings configured to engage with the clip piece, wherein two hook holes are opened on the end face of one side provided with the tapered casings, and of which the other end is provided with two hooks used to fit with two hooks used to connect with the hook holes disposed on the main tier-panel.

6 Claims, 3 Drawing Sheets

(51) Int. Cl.
*A47B 57/54* (2006.01)
*A47B 87/00* (2006.01)

(56) References Cited

U.S. PATENT DOCUMENTS

| | | | | | |
|---|---|---|---|---|---|
| 4,981,224 | A * | 1/1991 | Rushing | ............ | A47B 87/0223 211/126.12 |
| 5,218,914 | A * | 6/1993 | Dickinson | ......... | A47B 87/0223 108/65 |
| 5,924,581 | A * | 7/1999 | Chen | .................... | A47B 57/265 211/187 |
| 6,364,138 | B1 * | 4/2002 | Chen | ..................... | A47B 57/26 211/187 |
| 6,364,139 | B1 * | 4/2002 | Chen | .................... | A47B 57/265 248/245 |
| 7,478,971 | B2 * | 1/2009 | Li | ....................... | A47B 57/562 403/398 |
| 8,678,207 | B2 * | 3/2014 | Shimazaki | ........... | A47B 57/545 211/208 |
| 9,468,292 | B2 * | 10/2016 | Kuehn | ................... | A47B 57/34 |
| 9,854,906 | B1 * | 1/2018 | Ke | ..................... | A47B 47/0083 |
| 9,930,963 | B2 * | 4/2018 | Guizzardi | ............ | A47B 91/026 |
| 10,058,174 | B1 * | 8/2018 | Tang | ................... | A47B 57/545 |
| 10,709,238 | B1 * | 7/2020 | Thompson | .......... | A47B 96/066 |
| 11,350,743 | B2 * | 6/2022 | Reinhart | ............ | A47B 87/0215 |
| 12,070,124 | B2 * | 8/2024 | Whitta | ............... | A47B 47/0091 |
| 2002/0046982 | A1 * | 4/2002 | Guizzardi | ............ | A47B 57/545 211/187 |
| 2003/0131767 | A1 * | 7/2003 | Chen | ................... | A47B 57/265 108/147.13 |
| 2009/0241812 | A1 * | 10/2009 | Liu | ...................... | A47B 57/265 108/147.19 |
| 2010/0089852 | A1 * | 4/2010 | Wang | ....................... | A47F 5/13 211/153 |
| 2016/0015174 | A1 * | 1/2016 | Guizzardi | ........... | A47B 96/024 211/186 |
| 2016/0286956 | A1 * | 10/2016 | Guizzardi | ........... | A47B 91/026 |
| 2023/0129801 | A1 * | 4/2023 | Whitta | ............... | A47B 47/0083 211/134 |

* cited by examiner

PARALLELLY-CONNECTABLE STORAGE RACK

CROSS-REFERENCE TO RELATED PATENT APPLICATION

This application claims priority from the Chinese patent application 202321891025.6, filed Jul. 18, 2023, the content of which is incorporated herein in the entirety by reference.

TECHNICAL FIELD

The present disclosure relates to the technical field of home furnishing, in particular to a parallelly-connectable storage rack.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

People are now willing to buy a variety of items with the improvement of living standards, but increased shopping occurs concurrently with the problem of item storage, so most people choose to use storage racks to store various items. Most of the storage racks sold on the market have a kind of fixed structure provided by manufacturers and it is impossible for the storage racks to add storage panels on demands to increase the storage capacity. Accordingly, another kind of storage racks where storage panels can be additionally stacked in the height direction come on the market, but if too high height causes poor stability, it is risked with toppling over; in addition, in view of the diversity of items, storing this kind of items also presents certain requirements for the length of the storage racks.

SUMMARY

In order to solve the technical problem that the storage racks existing in the prior art can only be superimposed in the height direction with poor stability, the present disclosure provides a parallelly-connectable storage rack.

A parallelly-connectable storage provided in the present disclosure as a technical solution includes:
- a plurality of bamboo-joint rods, which are vertically arranged, and each of which is provided with a plurality of installation positions in its length direction;
- a clip piece arranged at the installation position of the bamboo-joint rod;
- a main tier-panel, of which four corners are respectively provided with a tapered casing trapping the clip piece, and which is respectively provided with two hook holes on two end faces spliced with each other; and
- a first accessory tier-panel, of which two corners of one end is provided with tapered casings configured to trap the clip piece, wherein two hook holes are opened on the end face of one side provided with the tapered casings, and of which the other end comprises two hooks that are fixed thereto, wherein the hooks are configured to be inserted in the hook holes disposed on the main tier-panel or a second accessory tier-panel that is identical to the first accessory tier-panel.

Preferably, the main tier-panel and the accessory tier-panel both include an edge frame and a storage plate, and, for each of the main tier panel and the first accessory tier panel, the storage plate is fixed on the inner edge of the edge frame.

Preferably, the hook hole is formed by way of pressing the edge frame outwards as a through groove protruding outwards at middle and opening upwards and downwards, the hook on the accessory tier-panel faces downwards and is hung in the hook hole during assembling.

Preferably, the storage plate may be a metal sieve pore plate or a wooden board.

Further, each clip piece comprises a first clipping piece and a second clipping piece, and the first clipping piece and the second clipping piece are each a semicircular rod wall; a concave portion and a convex portion are respectively disposed on the two mounting sides of the first clipping piece, correspondingly a concave portion and a convex portion matched with the first clipping piece are respectively disposed on the two mounting sides of the second clipping piece, wherein the first clipping piece and the second clipping are spliced with each other to be like a tube.

Further, an annular groove is defined at the installation position of the bamboo-joint rod, and a protruding restricting ring is set on the inner side of each clip piece, wherein each protruding ring is configured to be trapped in a respective annular groove at a respective installation position of a respective bamboo-joint rod from said plurality of bamboo-joint rods.

Compared with the prior art, by way of arranging hooks and hook holes at two ends of the main tier-panel and the accessory tier-panel, the present disclosure enables the two ends of the main tier-panel to be connected with the accessory tier-panel at the same height, and the accessory tier-panel to be successively connected with a second accessory tier-panel that is identical to the first accessory tier-panel, so that the accessory tier-panels can be connected infinitely with each other in the horizontal direction, thereby solving the problem that in the prior art the storage plates can only be superimposed along the height of the storage rack with poor stability; moreover, by way of arranging the clip pieces at the installation positions of different heights of the bamboo-joint rod, it also enables the spacing between tier-panels to change for the main tier-panel and the accessory tier-panel, and by way of further arranging more clip pieces and installing more tier-panels, it further enables the storage rack not only to be connected in parallel, but also to change the spacing and number of tier-panels in the vertical direction, so as to make use more flexible.

BRIEF DESCRIPTION OF THE DRAWINGS

In order to more clearly illustrate the technical solutions in the examples of the present disclosure, we shall briefly describe the drawings that need to be used in the description to the examples or the prior art as follows. Obviously, the drawings described as follows only represent some examples of the present disclosure, so a person skilled in the art can conceive other drawings on the basis of these drawings without making creative work.

Figure 1:
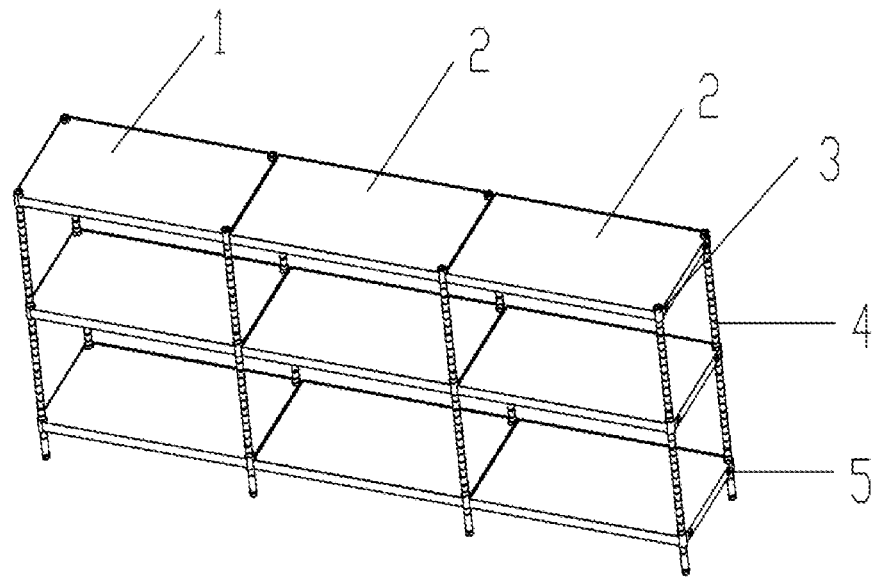
FIG. 1 is a right view of the example of the present disclosure.

Where, 1—main tier-panel; 2—accessory tier-panel; 3—tapered casing; 4—bamboo-joint rod; 5—hook hole; 6—hook; 7—clip piece; 8—sieve pore plate.

DETAILED DESCRIPTION OF SOME EMBODIMENTS

In order to make the technical problem to be solved by the present disclosure, the technical solution and the beneficial effect more clearly understood, we shall further explain the present disclosure in detail below in combination with the drawings and embodiments. It should be understood that the embodiments described herein are only used to explain the present disclosure, but not intended to pose any limitations on the present disclosure.

Now, we shall describe the principle and structure of the present disclosure in detail in combination with the drawings and embodiments as follows.

As shown in FIGS. 1-5, the parallelly-connectable storage provided in the present disclosure includes bamboo-joint rods 4, clip pieces 7, a main tier-panel 1 and a first accessory tier-panel 2. A plurality of bamboo-joint rods 4 are vertically arranged, and each provided with a plurality of installation positions in its length direction; a plurality of clip pieces 7 are arranged at the installation positions of the bamboo-joint rods 4. The main tier-panel has four corners that are respectively provided with the tapered casing 3, thus fixed on the outside of the clip pieces that are installed and trapped by the tapered casings at the four corners on the bamboo-joint rods 4. Two hook holes 5 are set on the surface that splices the left and right sides of the main tier-panel 1, respectively. Of the accessory tier-panel 2, at the corners of its one side, two tapered casings 3 are set, correspondingly on the end face at its one end provided with the tapered casing, two hook holes 5 are opened, and on the end face of the other side, two hooks 6 are set. Of the accessory tier-panel 2, one side provided with the tapered casing is connected with the clip piece on the bamboo-joint rod 4, and one end face provided with the hook 6 can be connected with one end face, provided with hook hole 5, of the main tier-panel or the accessory tier-panel 2 at the same height.

The bamboo-joint rods 4 are vertically arranged as a plurality, and they are a cylindrical long rod on which a plurality of annular grooves are arranged at intervals, and around which the installation position is formed. The installation positions on bamboo-joint rod 4 are arranged at equal distances, and the installation positions are parallel to each other. The installation position on bamboo-joint rod 4 is used to mount the clip piece 7, which consists of two parts installed around the installation position of the bamboo-joint rod 4, and which is trapped in the tapered casing 3.

The main tier-panel 1 is rectangular, and the four corners of the main tier-panel 1 are respectively provided with the tapered casing 3 sleeving the outside of the clip piece 7 on the bamboo-joint rod 4 at the same height. Two hook holes 5 are respectively arranged on the two surfaces splicing the ends of the main tier-panel 1, and are used to fit with the hooks 6 arranged on the accessory tier-panel 2.

The accessory tier-panel 2 is the same size as the main tier-panel 1, and can be spliced with the main tier-panel 1 at the same height or spliced with other accessory tier-panels 2 at the same height. The tapered casings 3 are arranged at two corners of one side of the accessory tier-panel 2, and trap the clip pieces 7 of the bamboo-joint rod 4 at the same height. Two hook holes 5 are opened on the end face, provided with the tapered casings face, at one side of the accessory tier-panel 2, and their number and position are consistent with the hook holes 5 of the main tier-panel 1, correspondingly two hooks 6 are disposed on the other end face of the accessory tier-panel 2, and their number is consistent with the number of the hook holes 5 at one end of the main tier-panel 1. The hook 6 on the end face of the accessory tier-panel 2 is hooked with the hook hole 5 on the end face of the main tier-panel 1 at the same height, so that the main tier-panel 1 is spliced with the accessory tier-panel 2. One end of the accessory tier-panel 2 already connected to the main tier-panel 1 and provided with the hook hole 5 can be connected with one end of the other accessory tier-panels 2 provided with the hooks 6, so as to enable the main tier-panel 1 to be spliced with a plurality of accessory tier-panels 2.

In the example shown in FIGS. 1-5, four bamboo-joint rods 4 are vertically arranged and provided with the clip pieces 7 at the installation positions at the same height and with three tiers of the main tier-panels. The main tier-panels 1 are installed by way of making the tapered casings 3 of the four corners sleeve the outer side of the clip pieces 7 on the four bamboo-joint rods 4 at the same height. The three tiers of the main tier-panels 1 are parallel to each other, and are arranged at intervals at different heights of the bamboo-joint rod 4 to form a storage rack. The end faces of two sides of the main tier-panel 1 are respectively provided with two hook holes 5, which are positioned at the left side and the right side of each end face respectively, and the number and position of the hook holes 5 on one end face are the same with those on the other end face, thus conveniently spliced with the accessory tier-panel 2. The accessory tier-panel 2 is the same size as the main tier-panel 1, and of the accessory tier-panel 2, the two corners of the right side are provided with the tapered casings 3, and on the right side, two hook holes 5 are arranged, and the position and number of hook holes 5 are consistent with the position and number of hook holes 5 of the main tier-panel 1. Two hooks 6 are arranged on the left end face of the accessory tier-panel 2, and the position of the hook 6 is the same as the position of the hook hole 5 of the main tier-panel 1. The hook 6 on the left end face of the accessory tier-panel 2 can be hooked with any one of hook holes 5 on the right end face of the main tier-panel 1 at the same height, thus the accessory tier-panel 2 is spliced on the right side of the main tier-panel 1, and the accessory tier-panel 2 lies on the same horizontal plane together with the main tier-panel 1. The two tapered casings 3 on the right side of the accessory tier-panel 2 are connected with two bamboo-joint rods 4 and used to support the accessory tier-panel 2. In the same way, the accessory tier-panel 2 can be spliced on the left side of the main tier-panel 1. One end of the accessory tier-panel 2 already connected to the main tier-panel 1 and provided with the hook hole 5 is successively connected with one end of the accessory tier-panel 2 provided with the hook 6. Similarly, two ends of the main tier-panel 1 can be connected in parallel with a plurality of accessory tier-panels 2 at the same height, so that the storage rack can be assembled in the horizontal direction, so as to achieve the purpose of flexible use.

It should be noted that for the main tier-panels 1 or the accessory tier-panels 2 in the same vertical direction it is necessary to firstly install those at the bottommost tier, and then install other main tier-panels 1 or accessory tier-panels 2 upwards in proper order.

In one embodiment, the clip piece 7 is clipped on the installation position of the bamboo-joint rod 4, and the tapered casings 3 at the four corners of the main tier-panel 1 correspond to the clip pieces 7 at the same height, respectively. On four bamboo-joint rods 4, the clip pieces 7 can simultaneously arranged at different heights and a plurality of main tier-panels 1 are fixed and parallel to each other, in addition, the spacing between the main tier-panels 1 can be changed following the height of the clip piece 7 fixed on the bamboo-joint rod 4.

Figure 6:
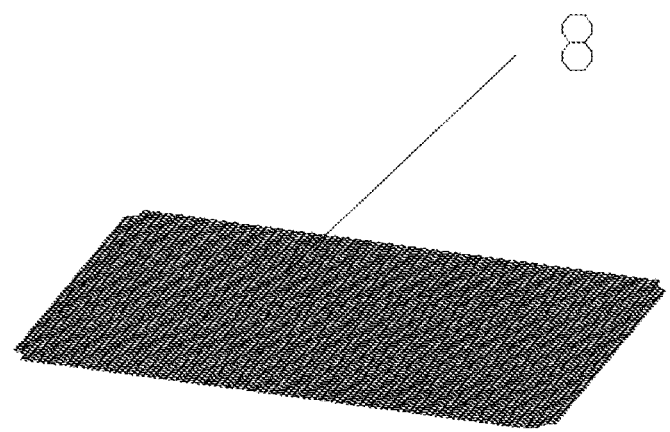
FIG. 6 is a diagram of the sieve pore plate of the present disclosure.

Preferably, the main tier-panel 1 and the accessory tier-panel 2 both include an edge frame and a storage plate. The edge frame is rectangular, the shape of the storage plate is the same as the shape of the inner edge of the edge frame, and the storage plate and the edge frame are spliced with each other to form the main tier-panel 1 or the accessory tier-panel 2. The storage plate may be a metal sieve pore plate or a wooden board. FIG. 6 shows an embodiment of using a metal sieve pore plate as the storage plate.

Figure 2:
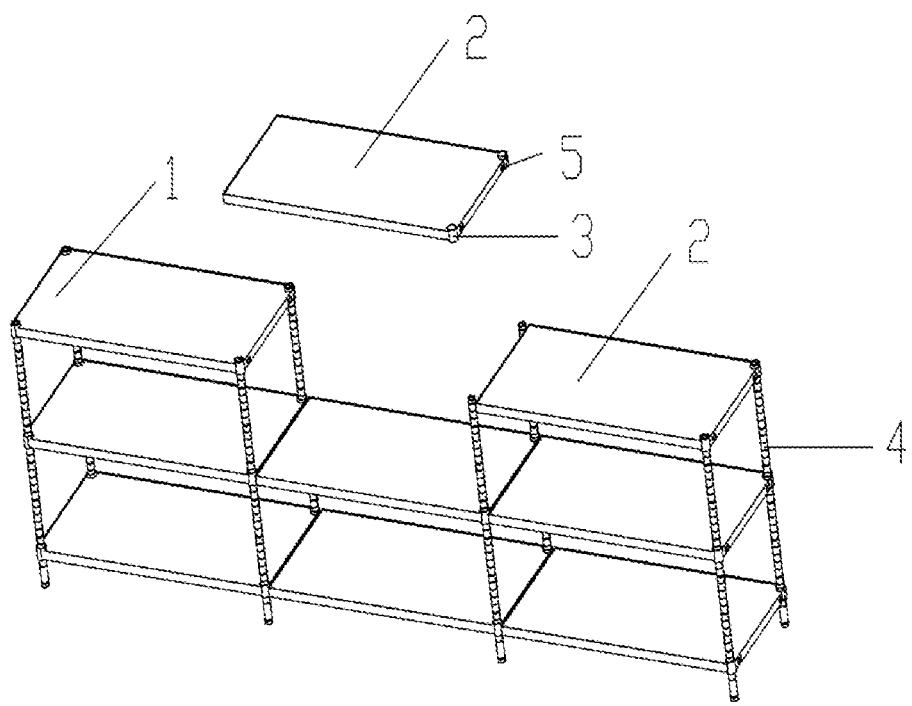
FIG. 2 is a right exploded view of the example of the present disclosure.
Figure 2A:
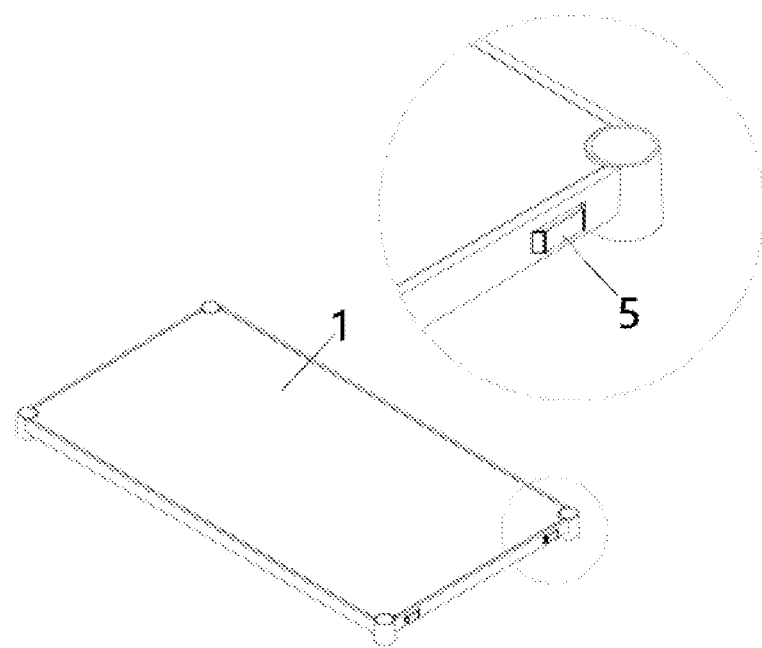
FIG. 2a is an enlarged view of the hook hole in FIG. 2.
Figure 3:
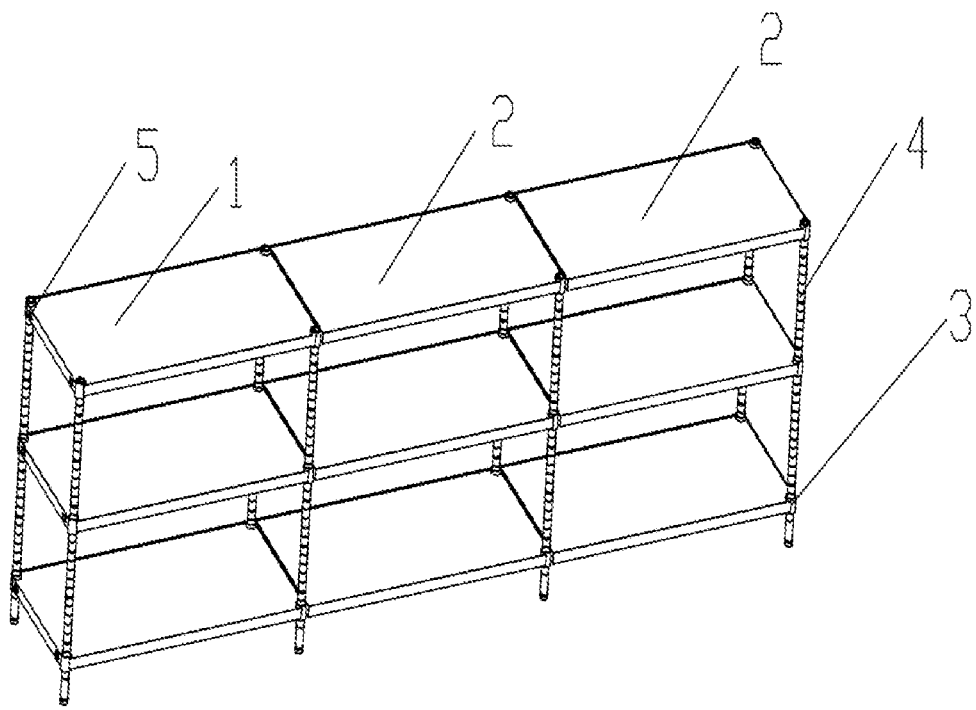
FIG. 3 is a left view of the example of the present disclosure.
Figure 4:
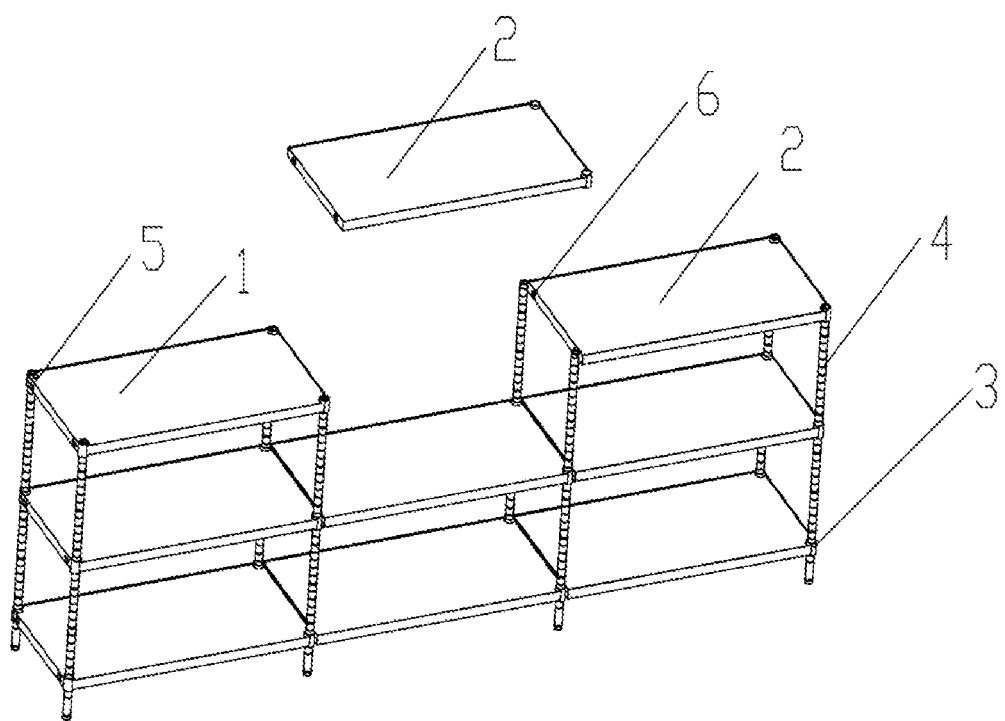
FIG. 4 is a left exploded view of the example of the present disclosure.

As shown in FIG. 2a, the hook hole 5 is formed by way of pressing an edge frame outwards as a through groove protruding outwards at middle and opening upwards and downwards, and the hole of the hook hole 5 is set vertically upwards, while the hook 6 on the accessory tier-panel faces downwards. During assembling, one end of the main tier-panel 1 or the accessory tier-panel 2 provided with the hook 6 is hung downwards in the hook holes 5 of the other main tier-panels 1 or accessory tier-panels 2.

Figure 5:
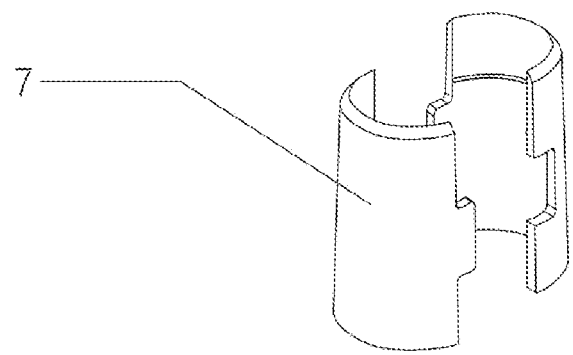
FIG. 5 is a diagram of the clip piece of the present disclosure.

As shown in FIG. 5, the clip piece 7 includes a first clipping piece and a second clipping piece, and the first clipping piece and the second clipping piece are each a semicircular rod wall; a concave portion and a convex portion are respectively disposed on the two mounting sides of the first clipping piece, correspondingly a concave portion and a convex portion matched with the first clipping piece are respectively disposed on the two mounting sides of the second clipping piece, thus the first clipping piece and the second clipping are spliced with each other to be like a tube.

Further, an annular groove is defined at the installation position of the bamboo-joint rod 4, and a protruding restricting ring is set on the inner side of the clip piece 7, thus of the restricting ring, one part is located on the first clipping piece, and the other part is located on the second clipping piece. During installation, the restricting ring on the clip piece is stuck in the annular groove at the installation position of the bamboo-joint rod, so that the clip piece 7 is installed at the installation position of the bamboo-joint rod 4. The clip piece 7 is trapped in the tapered casing 3, which is thin at the top and thick at the bottom. When the tapered casing 3 traps the clip piece 7 downwards, it can firmly sleeve the clip piece 7. It should be noted that the specific connection mode of bamboo-joint rod 4, the clip piece 7 and the tapered casing 3 is relatively common in the prior art, but the other common fixed connections should also be included in the protection scope of the present disclosure.

Compared with the prior art, by way of arranging hooks and hook holes at two ends of the main tier-panel and the accessory tier-panel, the present disclosure enables the two ends of the main tier-panel to be connected with the accessory tier-panel at the same height, and the accessory tier-panel to be successively connected with a second accessory tier-panel that is identical to the first accessory tier-panel, so that the accessory tier-panels can be connected infinitely with each other in the horizontal direction, thereby solving the problem that in the prior art the storage plates can only be superimposed along the height of the storage rack with poor stability. By arranging the clip pieces at the installation positions of different heights of the bamboo-joint rod, the present disclosure enables the spacing between tier-panels to change for the main tier-panel and the accessory tier-panel, and enables the storage rack not only to be connected in parallel, but also to change the spacing and number of tier-panels in the vertical direction, so as to make use more flexible.

The above content is only preferred examples of the present disclosure, not pose any limitations on the present disclosure, so a person skilled in the art can make various changes and variations on the present disclosure. Any modifications, equivalent replacements, improvements and the likes made within the essence and principle of the present disclosure should fall within the protection scope of protection of the present utility mode.

What is claimed is:

1. A parallelly-connectable storage comprising:
   a plurality of bamboo-joint rods, which are vertically arranged, wherein each of the plurality of bamboo-joint rods comprises a plurality of installation positions in its length direction;
   a clip piece arranged at each installation position of the plurality of installation positions of each bamboo-joint rod of the plurality of bamboo-joint rods;
   a main tier-panel, wherein each of four corners of the main tier-panel respectively comprises a tapered casing that is configured to engage with the clip piece, and each of two end faces of the main tier-panel respectively comprises two hook holes; and
   a first accessory tier-panel, wherein each of two corners of one end of the first accessory tier-panel comprises a tapered casing that is configured to engage with the clip piece, wherein the one end of the first accessory tier-panel comprises two hook holes along with the tapered casing of the first accessory tier-panel, and the other end of the first accessory tier-panel comprises two hooks, which are configured to be inserted into the hook holes on the main tier-panel or a second accessory tier-panel that is identical to the first accessory tier-panel located at a same height with the first accessory-panel.

2. The parallelly-connectable storage according to claim 1, wherein the main tier-panel and the first accessory tier-panel both comprise an edge frame and a storage plate, and, for each of the main tier panel and the first accessory tier panel, the storage plate is fixed on an inner edge of the edge frame.

3. The parallelly-connectable storage according to claim 2, wherein each hook hole of the main tier panel and the first accessory tier-panel comprises a through groove that protrudes outwards in a middle and that opens up and down, and the hook on the accessory tier-panel faces downwards and is hung in the hook hole during assembling.

4. The parallelly-connectable storage according to claim 2, wherein the storage plate of the main tier-panel and the storage plate of the second accessory tier-panel may be a metal or a wooden board.

5. The parallelly-connectable storage according to claim 1, wherein each clip piece comprises:
   a first clipping piece and a second clipping piece, wherein the first clipping piece and the second clipping piece are each a semicircular rod wall; and
   a concave portion and a convex portion that are respectively disposed on two mounting sides of the first clipping piece, wherein correspondingly a concave portion and a convex portion matched with the first clipping piece are respectively disposed on the two mounting sides of the second clipping piece, wherein the first clipping piece and the second clipping are spliced with each other.

6. The parallelly-connectable storage according to claim 5, wherein an annular groove is defined at the each installation position of the each bamboo-joint rod of the plurality of bamboo-joint rods, and a protruding restricting ring is set on an inner side of each clip piece, and each protruding restricting ring is configured to be trapped in a respective annular groove at a respective installation position of a respective bamboo-joint rod from the plurality of bamboo-joint rods.

\* \* \* \* \*